(12) United States Patent  
Watson (10) Patent No.: US 11,757,397 B2
(45) Date of Patent: *Sep. 12, 2023

(54) ADJUSTABLE CLIP ASSEMBLY FOR SOLAR MODULES

(71) Applicant: Nextracker LLC, Fremont, CA (US)

(72) Inventor: Tyler Watson, San Francisco, CA (US)

(73) Assignee: Nextracker LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,890

(22) Filed: Aug. 1, 2022

(65) Prior Publication Data

US 2022/0376646 A1 Nov. 24, 2022

Related U.S. Application Data

(63) Continuation of application No. 17/118,557, filed on Dec. 10, 2020, now Pat. No. 11,404,996, which is a continuation of application No. 16/529,511, filed on Aug. 1, 2019, now Pat. No. 10,868,490.

(51) Int. Cl.
*A47G 1/10* (2006.01)
*H02S 20/00* (2014.01)
*F16B 5/12* (2006.01)
*F24S 25/634* (2018.01)

(52) U.S. Cl.
CPC ............. *H02S 20/00* (2013.01); *F16B 5/123* (2013.01); *F24S 25/634* (2018.05)

(58) Field of Classification Search
CPC ........ F16B 43/00; F16B 39/24; F16B 29/282; F16B 2/22; H02S 20/00; F24S 25/61

USPC ................... 248/316.7, 237; 52/173.3, 483.1
See application file for complete search history.

(56) References Cited

U.S. PATENT DOCUMENTS

| | | | |
|---|---|---|---|
| 4,331,492 A | 5/1982 | Dominguez et al. | |
| 5,482,233 A | 1/1996 | Marko et al. | |
| 6,341,454 B1 | 1/2002 | Koleoglou | |
| 6,672,018 B2 * | 1/2004 | Shingleton | F24S 25/636 |
| | | | 126/621 |
| 7,814,899 B1 | 10/2010 | Port | |
| 7,972,177 B2 | 7/2011 | Richter | |
| 8,025,508 B2 | 9/2011 | Parker et al. | |
| 8,099,922 B2 | 1/2012 | Kellerman | |
| 8,205,400 B2 | 6/2012 | Allen | |
| 8,347,565 B2 * | 1/2013 | Carroll | F21V 15/01 |
| | | | 52/173.3 |

(Continued)

OTHER PUBLICATIONS

PCT Search Report and Written Opinion issued in PCT Application No. PCT/US2020/044285 dated Oct. 21, 2020, 11 pages.

(Continued)

*Primary Examiner* — Todd M Epps
(74) *Attorney, Agent, or Firm* — Fredrikson & Byron, P.A.

(57) ABSTRACT

The present disclosure describes a solar power system including rails, solar modules, and a plurality of adjustable clips to secure the solar modules to the rails. The clips include at least a base member, an elastomeric support member, a bracket member, and an alignment member configured to secure the various members of the clip together. The adjustable clips are configured to slide within a slot defined through a portion of a surface of a rail and including a recessed edge thereby allowing the rail system to accommodate solar modules of varying dimensions.

20 Claims, 7 Drawing Sheets

(56) References Cited

U.S. PATENT DOCUMENTS

| | | | |
|---|---|---|---|
| 8,418,983 B2 * | 4/2013 | Hartelius | F24S 25/634 |
| | | | 248/500 |
| 8,495,997 B1 * | 7/2013 | Laubach | H02S 20/10 |
| | | | 126/621 |
| 8,572,909 B2 | 11/2013 | Rivera et al. | |
| 8,590,223 B2 | 11/2013 | Kilgore et al. | |
| 8,813,452 B2 | 8/2014 | Kellerman | |
| 8,894,424 B2 | 11/2014 | DuPont | |
| 8,910,433 B2 | 12/2014 | Kacandes | |
| 9,316,416 B2 | 4/2016 | Poulakis | |
| 9,362,442 B2 | 6/2016 | Kacandes | |
| 9,543,888 B2 * | 1/2017 | Au | H02S 20/32 |
| 10,128,791 B2 | 11/2018 | Ludwig et al. | |
| 10,461,682 B2 * | 10/2019 | Schuit | F24S 25/636 |
| 10,480,830 B2 | 11/2019 | Lin | |
| 10,707,803 B2 * | 7/2020 | Pretorius | H02S 99/00 |
| 10,868,490 B1 * | 12/2020 | Watson | F16B 2/22 |
| 10,989,247 B2 * | 4/2021 | Uppu | H02S 20/00 |
| 11,404,996 B2 * | 8/2022 | Watson | F16B 5/123 |
| 2003/0070368 A1 | 4/2003 | Shingleton | |
| 2011/0078892 A1 | 4/2011 | Hartelius et al. | |
| 2013/0161457 A1 | 6/2013 | Klinga | |
| 2013/0193297 A1 | 8/2013 | Hartelius et al. | |
| 2016/0365827 A1 | 12/2016 | Au | |

OTHER PUBLICATIONS

Examination Report No. 1 issued in Australian Patent Application No. 2020321373 dated Nov. 3, 2022, 3 pages.

Notice of Acceptance issued in Australian Patent Application No. 2020321373 dated Dec. 8, 2022.

European search report for corresponding EP patent application 20847059, dated Jun. 19, 2023, 7 pgs.

* cited by examiner

ADJUSTABLE CLIP ASSEMBLY FOR SOLAR MODULES

CROSS-REFERENCE TO RELATED APPLICATION(S)

This application is a continuation of U.S. patent application Ser. No. 17/118,557 filed Dec. 10, 2020, which is a continuation of U.S. patent application Ser. No. 16/529,511 filed on Aug. 1, 2019, the disclosure of which is hereby incorporated by reference in its entirety.

BACKGROUND

1. Technical Field

The present disclosure relates to clip assemblies suitable for mounting at least one solar module to a support structure or rail of a solar power system. More particularly, the present disclosure relates to adjustable clip assemblies configured to slide along a surface of a support structure or rail of a solar power system for securing solar modules to a rail, frame, or rack. The clip assemblies include at least a base member, an elastomeric support member, a bracket member, and an alignment member.

2. Discussion of Related Art

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

Solar power systems employ solar modules including solar panels made of amorphous, crystalline, or monocrystalline silicon or other materials to convert sunlight into electricity. Typically, a plurality of solar modules is interconnected with wiring to one or more appropriate electrical components (e.g., switches, inverters, junction boxes, etc.) and encapsulated within a weather-proof barrier or frame.

Regardless of an exact construction of the PV laminate, most PV applications entail placing an array of solar modules at the installation site in a location where sunlight is readily present. This is especially true for residential, commercial, or industrial applications in which multiple solar modules are desirable for generating substantial amounts of energy.

In some arrangements, solar modules are placed side-by-side in an array. Each solar module can be mounted to a support structure, such as a rail, by coupling the module to the support structure (e.g., a rail) by way of a coupling member, e.g., clip assembly. It can be challenging to couple modules side-by-side because the array assembler typically engages the coupling member while also ensuring that adjacent modules are positioned properly on the support structure. Accordingly, there remains a continuing need for improved systems and methods for mounting solar modules to a support structure.

SUMMARY

The present disclosure provides a solar power system including rails, solar modules, and a plurality of clip assemblies configured to secure the solar modules to the rails. The clip assemblies are configured to be slidably attached to the rail thereby remaining capable of sliding along a top surface of the rail to accommodate different size solar modules. Each clip assembly includes a first proximal portion configured to be attached, and ultimately tightened or fixed, to the rail and a second distal portion configured to receive and secure an end of the solar module within a portion of the clip assembly. The clip assemblies, via both first and second portions, secure the solar module to the rail.

The present disclosure provides clip assemblies configured to mount a solar module to a railing system. The clip assemblies described herein include at least a base member, a bracket member, an elastomeric support member sandwiched between the base member and the bracket member, and alignment member.

The base member is configured to slide along a surface of a rail of the railing system. The base member is also configured to carry the elastomeric support member and the bracket a member as the base member is slid. The base member also includes a base aperture defined therethrough. In some embodiments, the base aperture is centered on the base member. In some embodiments, the base member is generally planar. In some embodiments, the base includes a plurality of tangs extending from a bottom surface of the base member. In some embodiments, the base member includes at least one set of tangs separated by a distance equal to or greater than a width of a rail and extending generally perpendicular from a bottom surface of the base member.

The bracket member is configured to be positioned on a top surface of the elastomeric support member opposite the base member. The bracket member provides additional support to the elastomeric support member to secure the solar module within the elastomeric support member. The bracket member being made of a stiffer and/or more rigid material than the elastomeric support member. The bracket member also includes a bracket aperture.

In some embodiments, the bracket member further includes a vertical bracket wall including a first end and a second opposite end, the first end of the vertical bracket wall being attached to a lower flange extending in a first direction therefrom, the lower flange including the bracket aperture. The second opposite end of the vertical bracket wall being attached to an upper flange extending in a second direction therefrom opposite the first direction.

In some embodiments, the bracket member further includes at least one locking tab positioned on the upper flange. In some embodiments, the lower flange extends from the first end of the vertical bracket wall a first length which is greater than a second length that the upper flange extends from the second opposite end of the vertical bracket wall. In some embodiments, the lower flange extends from the first end of the vertical wall at a first angle equal to about 90° and the upper flange extends from the second opposite end of the vertical bracket wall at a second angle which is less than about 90°. In some embodiments, the bracket member is an S-shaped bracket member.

The elastomeric support member is configured to be positioned on a top surface of the base member opposite the rail. The elastomeric support member is also configured to receive the bracket member on a proximal portion of the support member and a solar module on a distal portion of the support member. The elastomeric support member also includes a support aperture.

In some embodiments, the elastomeric support member includes a support base having a first support base portion and a second support base portion. In some embodiments, a top surface of the first base portion is configured to receive the lower flange of the bracket member and a top surface of the second base portion is configured to receive an end of the solar module.

In some embodiments, the first support base portion is thinner than the second support base portion. In some embodiments, a thickness of the first support base portion and a thickness of the lower flange of the bracket member combined is equal to a thickness of the second support base portion.

In some embodiments, the second support base portion of the support base further includes a vertical support member extending generally perpendicular therefrom and including a generally C-shaped notch on a free end portion opposite the second support base portion. The C-shaped notch is configured to receive the upper flange and at least one locking tab of the vertical bracket wall. In some embodiments, the generally C-shaped notch includes a first larger recess configured to receive an end of the upper flange and optionally a second smaller recess configured to receive the at least one locking tab.

In some embodiments, the second support base portion, the vertical support member and the C-shaped notch display the same general thickness.

In some embodiments, the vertical support member includes a plurality of grip elements extending from an outer surface of the C-shaped notch opposite a top surface of the second support base portion.

The alignment member has an elongate body defined between a first end portion and a second end portion. The first end portion includes a head and the elongate body includes a channel extending therethrough. The alignment member also includes a resilient locking member fixed on an outer perimeter of the elongate body between the first and second end portions. The elongate body is configured to be positioned through the base aperture, the support aperture and the bracket aperture securing the base member, the elastomeric support member and the bracket member between the head and the resilient locking member of the alignment member to form the clip assembly.

In some embodiments, the locking member is spaced apart from the head portion of the alignment member a distance equal to or less than the thickness of the first support base portion and the thickness of the lower flange of the bracket member combined to lock the bracket member, the elastomeric support member and the base member between the head and the resilient locking member.

In some embodiments, the channel of the alignment member is threaded to receive a fastener. In some embodiments, an outer surface of the alignment member is not threaded. In some embodiments, the fastener is positioned within a channel extending through the entirety of the alignment member to secure the clip assembly to a rail.

The clip assemblies described herein may be combined with at least a solar module and a rail configured to support the solar module to form a solar power system or kit for a solar power system. The rail including at least one, if not more than one, rail slot defined within the rail and configured to receive one or more clip assemblies as described herein. In embodiments, the rail slot includes a recessed edge configured to receive the head of the alignment member therein.

Methods of installing solar modules, and particularly frameless glass solar modules, onto a rail of a solar power system using the clip assemblies described herein are also described.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

As described herein, the present disclosure describes adjustable clip assemblies suitable for mounting at least one solar module to a railing system of a solar power system. The solar power system may be any type of solar power system, such as a roof-top solar power system, or a solar tracker system, and the like. In particular embodiments, the solar power system includes glass solar modules, which may or may not be frameless and the clip assemblies described herein.

Figure 1A:
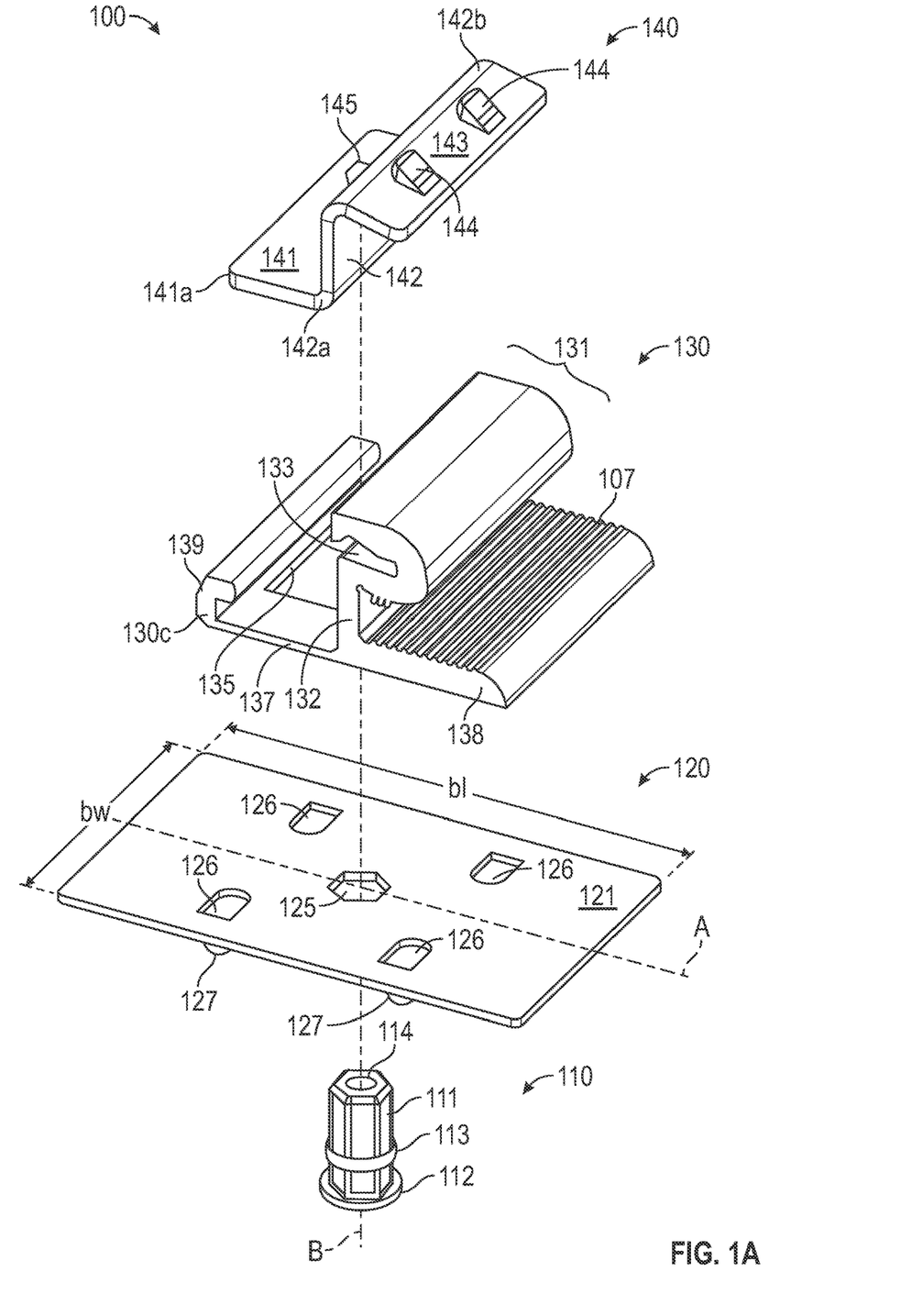
FIG. 1A is an expanded perspective view of a clip assembly as described in at least one embodiment herein.

Solar modules, and in particular embodiments, frameless solar modules including glass solar modules, may be attached to mounting rails using the adjustable clip assemblies described herein. FIG. 1A depicts an expanded perspective view of an adjustable clip assembly 100 configured to slide along a surface of a mounting rail, the clip assembly including an alignment member 110, a base member 120 an elastomeric support member 130, and a bracket member 140.

The base member 120 is configured to be secured onto a top side of an end portion of a mounting rail (see FIGS. 2A-4B) in a manner which allows the base member 120 to slide a predetermined distance along the end portion of the mounting rail. The predetermined distance being equal to a length of a slot defined through the end portion of the mounting rail in which a portion of the clip assembly is positioned. The base member may be made of any suitable metal or metal alloy material, including but not intended to be limited to, steel, aluminum, iron, and the like.

As depicted in FIG. 1A, the base member 120 is generally planar and is configured to lie flat along a top side of the mounting rail and in direct contact with the topside of the mounting rail. The base member 120 includes a base length (bl) and a base width (bw) wherein the base length (bl) extends along the longitudinal axis A of the base member 120 and the base width (bw) extends perpendicular to the longitudinal axis A. The base length (bl) being greater than the base width (bw) of the base member 120. The base width (bw) being greater than or equal to the width of the mounting rail.

Base member 120 includes a top surface 121 opposite a bottom surface 122 with a base thickness 123 defined therebetween. Base aperture 125 is defined completely through the thickness 123 of the base member 120. In some embodiments, base aperture 125 is centered on base member 120. As depicted, the base aperture 125 may be hexagonal, however, it is envisioned that the base aperture 125 may be of any polygonal shape or configuration. Some non-limiting examples of suitable polygonal shapes include triangular, square, rectangular, pentagonal, hexagonal, heptagonal, octagonal, and the like.

The base member 120 may also include a plurality of base openings 126 and a plurality of tangs 127. The base openings 126 are positioned around the base aperture 125 through the top surface 121 of the base member 120. In some embodiments, the base openings 126 are equidistant from the base aperture 125. The tangs 127 extend away from the bottom surface 122 of the base member 120 in a generally perpendicular plane relative to the longitudinal axis A of the base member 120. The tangs 127 are configured to maintain the base member 120 positioned the top side of a rail. In some embodiments, at least two of the tangs 127 are spaced apart from each other a distance generally equal to or slightly greater than the width of the rail to stabilize the base member 120 and/or clip assembly 100 on the surface of the rail. In some embodiments, at least two pairs of the tangs 127 are spaced apart from each other a distance generally equal to or slightly greater than the width of the rail.

As depicted, in some embodiments, at least a portion of each base opening 126 is formed by carving out some portion of the base member 120. As further depicted, a portion of the base member 120 which is carved out to form the base opening 126 may be bent to form a tang 127. In such instances, the base openings 126 and the tangs 127 share a common portion of the base member 120 that defines a border of the base opening 126 and also attaches the tang 127 to the base member 120.

The clip assembly also includes a bracket member 140. The bracket member 140 includes a vertical bracket wall 142 attached on a first end 142a to lower flange 141 and on a second opposite end 142b to an upper flange 143, the upper flange 143 including at least one locking tab 144 positioned on a top surface 143a of the upper flange 143. The lower flange 141 extending proximally, i.e., away from the solar module, from the first end 142a of vertical bracket wall 142 and upper flange 143 extending distally, i.e., towards the solar module, from the second end 142b of vertical bracket wall 142. The lower flange 141 further including a bracket aperture 145.

The lower flange 141 includes a lower bracket length (lbl) which is generally equal to a vertical bracket length (vbl) of the vertical bracket wall 142, both of which are generally greater than an upper bracket length (ubl) of upper flange 143. The lower and upper bracket lengths combined equal the total length of the vertical bracket wall 142. The bracket member 140 may be made of any suitable metal or metal alloy material, including but not intended to be limited to, steel, aluminum, iron, and the like.

The lower flange 141 and the vertical bracket wall 142 form a first angle ($a_1$) ranging from about 75 to 105 degrees. In some embodiments, the first angle ($a_1$) ranges from about 85 to 95 degrees. In some embodiments, the first angle ($a_1$) is about 90 degrees.

The upper flange 143 and the vertical bracket wall 142 form a second angle ($a_2$) ranging from about 45 to 90 degrees. In some embodiments, the second angle ($a_2$) ranges from about 55 to 85 degrees. In some embodiments, the second angle ($a_2$) ranges from about 60 to 80 degrees.

In some embodiments, the bracket member 140 is a generally S-shaped bracket member 140. The bracket member and/or S-shaped bracket member is configured to matingly engage the elastomeric support member 130 described in more detail hereinbelow.

The elastomeric support member 130 is configured to be positioned between the bracket member 140 and the base member 120. The elastomeric support member 130 includes a bottom support surface 130a configured to be positioned on the top surface 121 of the base member 120. The elastomeric support member 130 also includes a top support surface 130b configured to receive the bracket member 140 and an end portion of a solar module. The proximal portion of the elastomeric support member is sandwiched between the bracket member 140 and the base member 120. The distal portion of the elastomeric support member is positioned between the solar module and the base member 120.

The elastomeric support member 130 includes a support base 136 including a first support base portion 137 and a second support base portion 138. The first support base portion 137 is configured to receive the lower flange 141 of the bracket member 140. The second support base portion 138 is configured to receive an end portion of a solar module. Thus, the second support base portion 138 is positioned closest to the solar module and the first support base portion 137 positioned farthest from the solar module.

As depicted, the second support base portion 138 has a thickness $T_1$ which is greater than a thickness $T_2$ of the first support base portion 137. In some embodiments, the thickness $T_1$ of the second support base portion 138 is generally equal to the combination of the thickness $T_2$ of the first support base portion 137 and the thickness $T_3$ of the lower flange 141 of the bracket member 140.

The first support base portion 137 may also include a first notch 139 positioned on a proximal end portion 130c of the elastomeric support member 130. As shown, the first notch 137 may be a C-shaped first notch. The first notch 139 configured to receive a proximal end portion 141a of the lower flange 141 of the bracket member 140 to further secure the bracket member 140 to the elastomeric support member 130.

The second support base portion 138 includes a vertical support member 131 extending generally perpendicular from on a proximal end portion 138a of the second support base portion 138. The vertical support member 131 is configured to matingly engage the vertical bracket wall 142, upper flange 143, and locking tab 144 of bracket member 140. The vertical support member 131 includes a vertical support wall 132 extending generally perpendicular to the second support base portion 138 and a second notch 133, in some embodiments a second C-shaped notch, positioned on an end portion 132a of the vertical support wall 132.

The second notch 133 is configured to open proximally to receive the upper flange 143 and locking tab(s) 144 of the bracket member 140. The second notch 133 includes a first recess 134a configured to receive and maintain the upper flange 143 of the bracket member 140 and optionally a second recess 134b configured to receive and maintain the locking tab(s) 144. In some embodiments, the combination of the vertical support wall 132 and the second notch 133 form a generally P-shaped vertical support member 131.

Figure 1B:
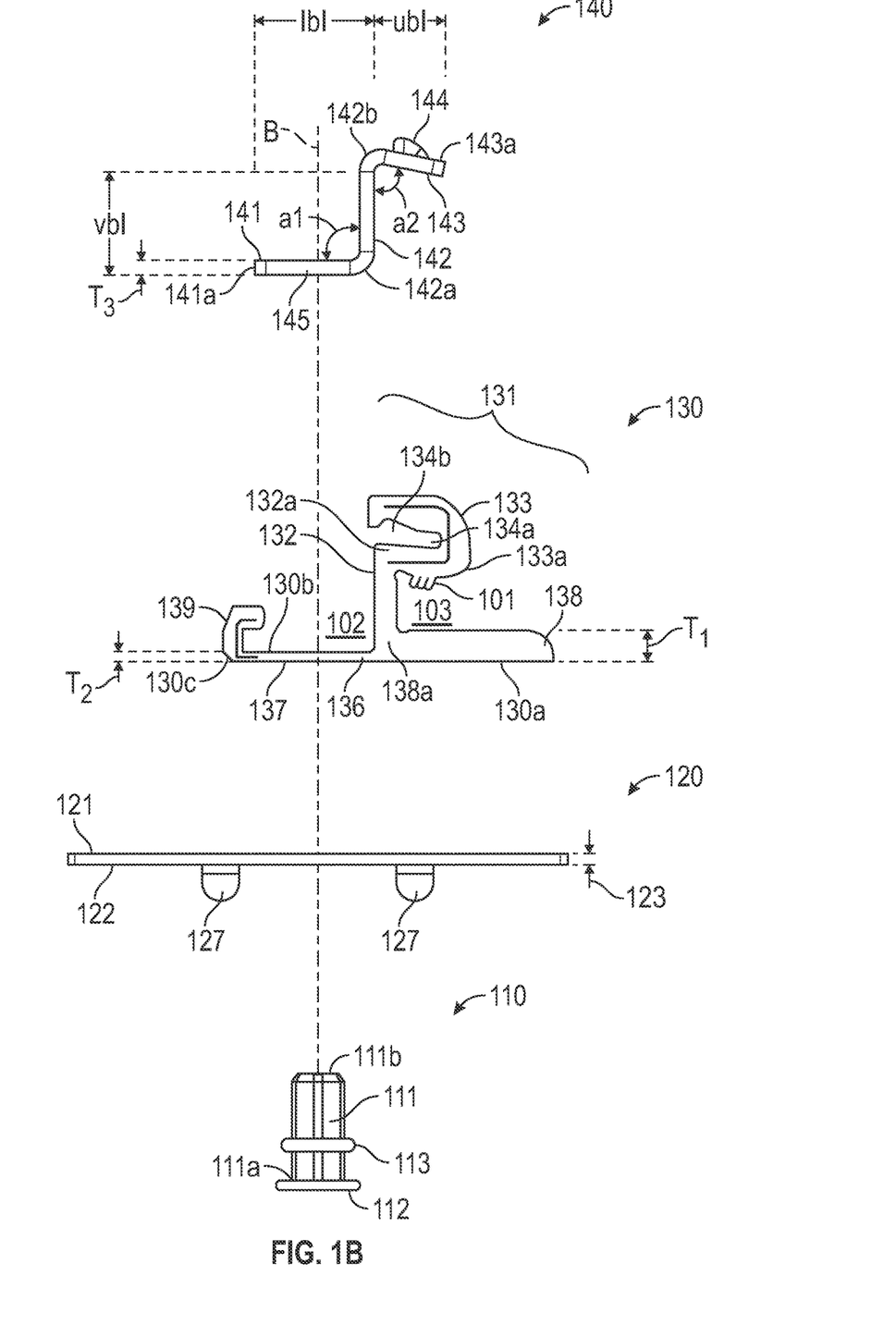
FIG. 1B is an expanded side view of the clip assembly of FIG. 1A and as described in at least one embodiment herein.

As further depicted in FIGS. 1A and 1B, a bottom outer surface 133a of the second notch 133 includes grip-members 101 extending from the second notch 133, and particularly the bottom outer surface 133a of the second notch 133, towards the second support base portion 138 and into module slot 103. Any number of grip-members 101 may be positioned on the bottom outer surface 133a of the second notch 133. The grip-members 101 being configured to increase friction between the bottom surface 133a of the second notch 133 to a top surface of a solar module.

Figure 4A:
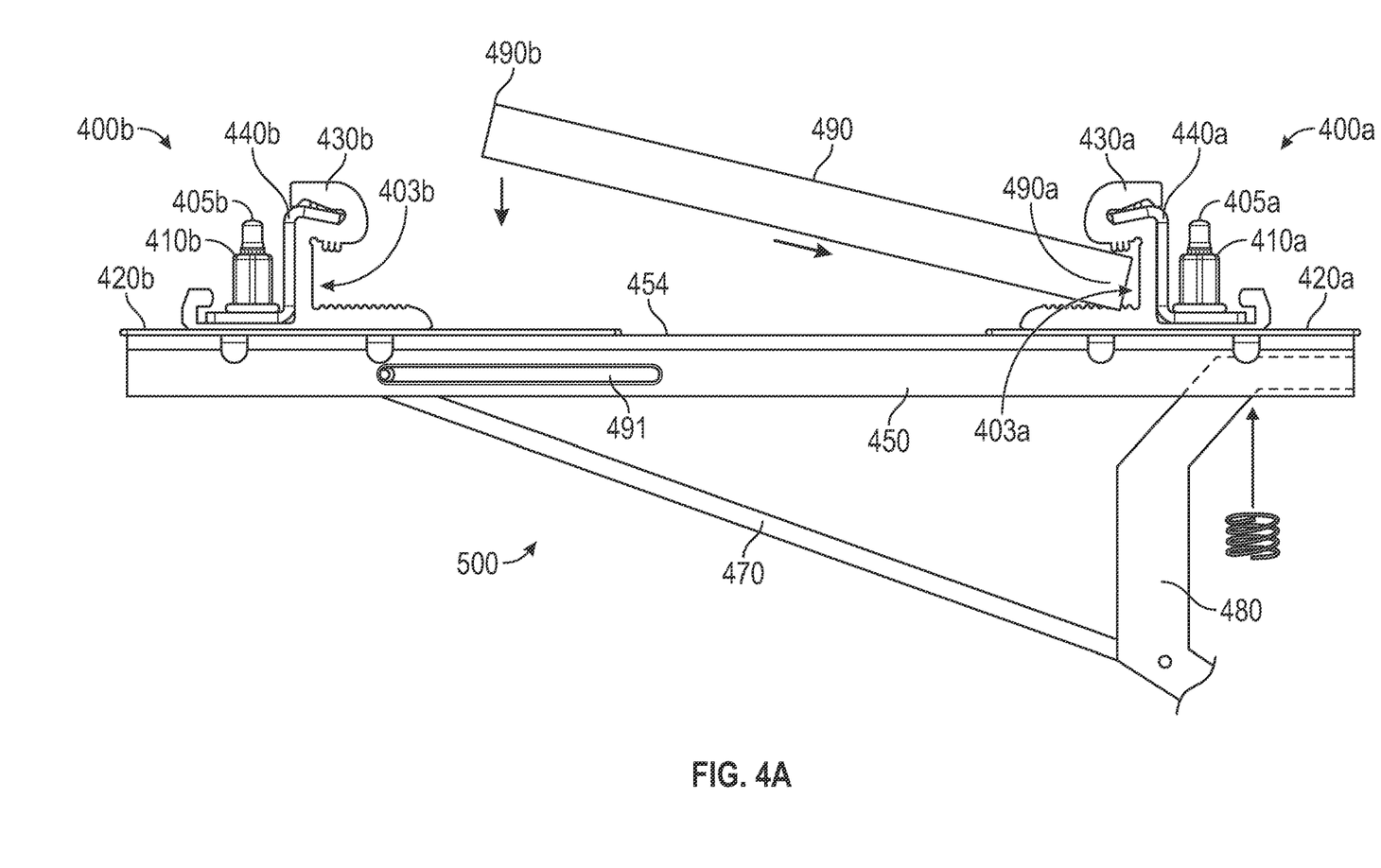
FIGS. 4A and 4B are side views of a clip assembly, a rail, and a solar module as described in at least one embodiment herein.
Figure 4B:
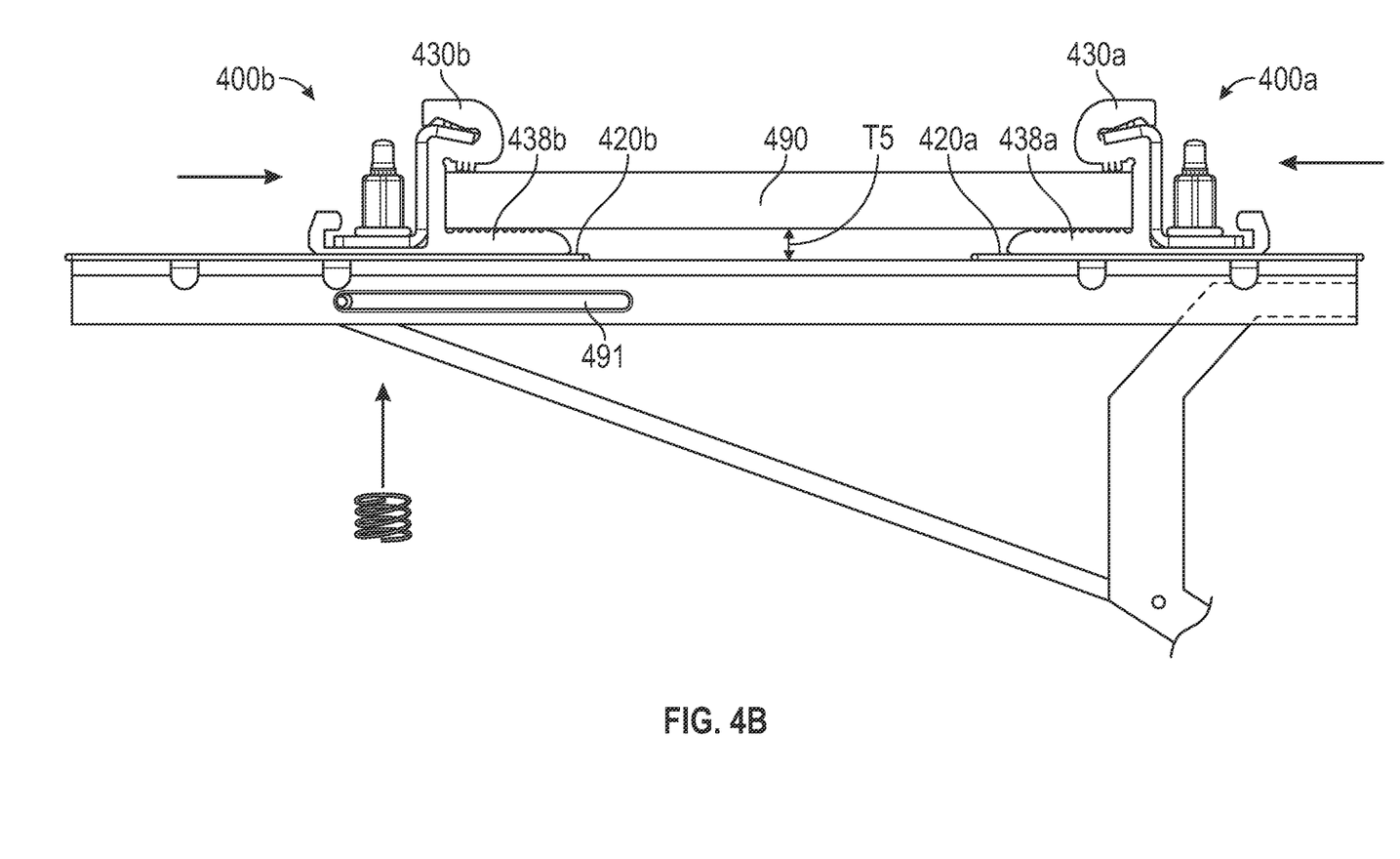

Module slot 103 is configured to receive and maintain an end portion of a solar module (see FIG. 4A-4B). Slot 103 is formed between and/or defined by a portion of the second support base portion 138 and the vertical support member 131. In some embodiments, the slot 103 is formed between and/or defined by outer bottom surface 133a of the second notch 133 hanging over and spaced apart from a proximal end portion of the second support base portion 138 by vertical support wall 132. In some embodiments, the top surface of the second support base portion 138 may be textured 107 to further secure and maintain the end of the solar module within module slot 103.

Elastomeric support member 130 also includes a support aperture 135. The support aperture 135 and the bracket aperture 145, individually, may be polygonal in design. In some embodiments, at least one of the support aperture 135 or bracket aperture 145 may be rectangular. In some embodiments, at least one of the support aperture 135 or bracket aperture 145 may be hexagonal.

In some embodiments, the support aperture 135 is a different polygon than at least one, if not both, of the base aperture 125 or the bracket aperture 145. For example, as shown in FIG. 1A, the base aperture 125 is hexagonal while the support aperture 135 is rectangular and larger in surface area than the base aperture 125. In some embodiments, the base aperture 125 and the bracket aperture 135 are the same polygonal configuration, such as for example hexagonal, while the support aperture 145 is a different polygonal configuration, such as for example rectangular. In still other embodiments, the base aperture 125, the support aperture 135, and the bracket aperture 145 are all the same polygonal shape, such as hexagonal.

When the base member 120, the elastomeric support member 130, and the bracket member 140 are properly assembled each of the base aperture 125, support aperture 135, and bracket aperture 145 will align vertically along a vertical axis B (generally perpendicular to longitudinal axis A) to allow alignment member 110 to pass therethrough. Alignment member 110 includes an elongate body 111 extending from a head 112, on a first end portion of the alignment member 110, to a second end portion 111b of the elongate body 111. The elongate body 111 has a length or height sufficient to pass through each of the base aperture 125, support aperture 135, and bracket aperture 145 and extend beyond the bracket aperture 145 of the clip assembly 100. The elongate body 111 of the alignment member 110 also includes a channel 114 defined therethrough from the first end portion 111a to the second end portion 111b. The channel 114 is configured to receive a fastener to secure the base member, the support member, and the bracket member to a rail. The channel 114 extends through the head 112 of the alignment member 110.

Alignment member 110 further includes a resilient locking member 113 surrounding an outer perimeter of the elongate member 111. The locking member 113 is spaced along a length of the elongate body 111 from the head 112 by a distance generally equal to or slightly less than the thickness 123 of the base member 120, the first support base portion 137, and the lower flange 141 in combination. The locking member 113 is configured to secure and maintain the base member 120, the support member 130, and the bracket member 140 together against the head 112 of the alignment member 110. By being spaced a distance generally equal to or slightly less than the collective thickness of the base member 120, the first support base portion 137, and the lower flange 141, the resilient locking member 113 and the head 112 of the alignment member 110 are able to pinch each of the base member 120, support member 130, and bracket member 140 therebetween. In some embodiments, the resilient locking member is made of an elastomeric material, such as a rubber material, and the head of the alignment member is made of stiff, non-resilient material, such as steel or aluminum.

Figure 2A:
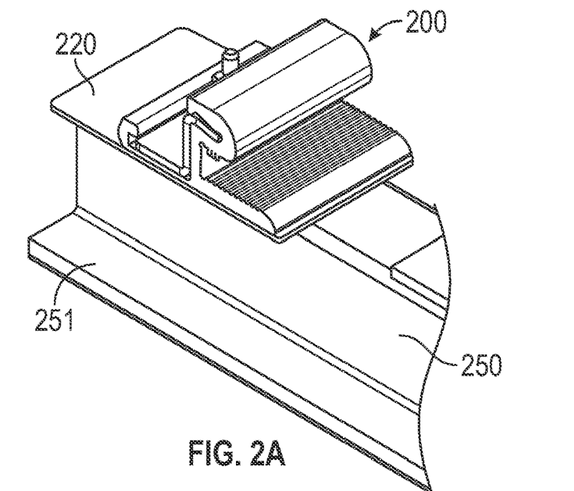
FIG. 2A is a perspective view of a clip assembly and rail as described in at least one embodiment herein.
Figure 2B:
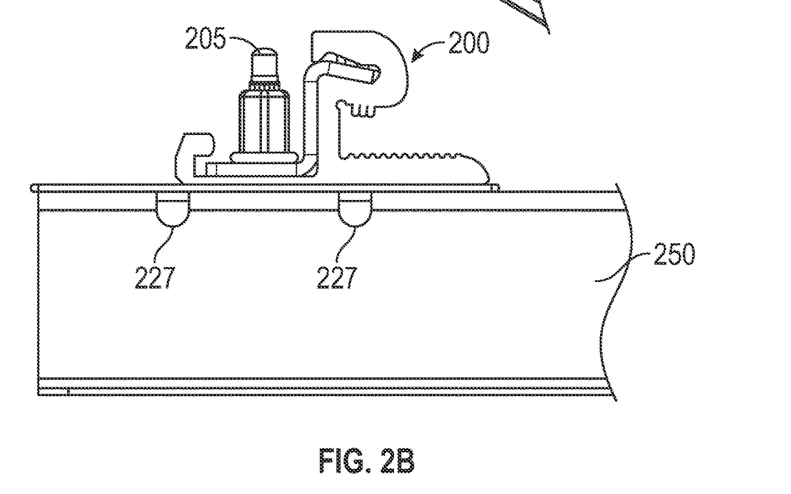
FIG. 2B is a side view of the clip assembly and rail of FIG. 2A and as described in at least one embodiment herein.
Figure 2C:
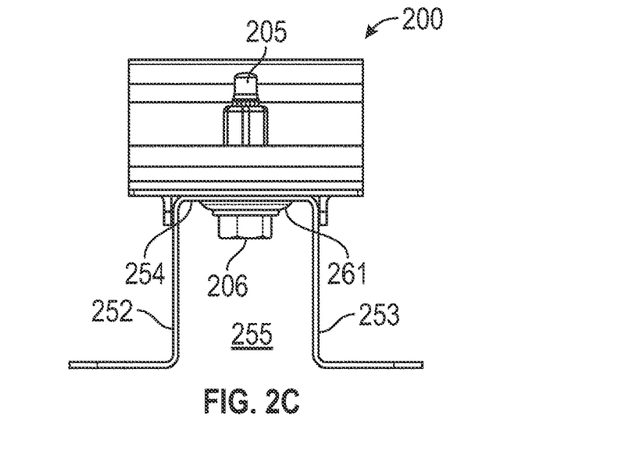
FIG. 2C is a front-end view of the clip assembly and rail of FIG. 2A and as described in at least one embodiment herein.
Figure 2D:
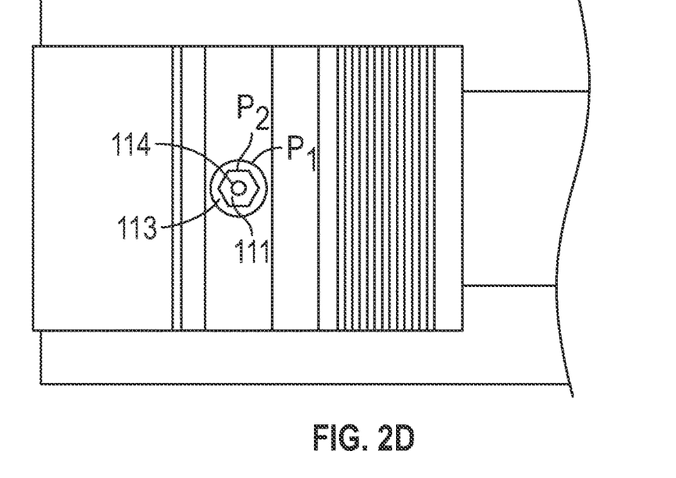
FIG. 2D is a top view of the clip assembly and rail of FIG. 2A and as described in at least one embodiment herein.

As best depicted in FIG. 2D, the outer perimeter ($p_1$) of the locking member 113 is greater than the outer perimeter ($p_2$) around the elongate body 111 of the alignment member 110. In some embodiments, the outer perimeter ($p_1$) of the locking member 113 is smaller than or equal to the outer perimeter of the head 112. As further depicted in FIG. 2D, as well as other figures provided herein, in some embodiments, the locking member 113 may be generally circular or rounded, as compared to the polygonal configurations of the elongate body 111 of the alignment member 110 or each of the apertures 125, 135, 145 described herein. It is believed that the resilient nature of the locking member 113, alone or in combination with the generally circular or rounded configuration of locking member 113, allows the locking member 113 to be passed through apertures of various sizes and polygonal shapes, while remaining capable of securing each of the base member 120, support member 130, and bracket member 140 between the head 112 of the alignment member 110.

In some embodiments, the locking member 113 is an O-ring fixed to an outer perimeter of the elongate body 111 of the alignment member 110.

The alignment member 110, including the head 112 and elongate body 111, can be made of any suitable material including but not limited to any combination of plastic or metal material, alone or in combination. Some suitable non-limiting examples include polycarbonate, acrylonitrile butadiene styrene, steel, aluminum, iron, and the like.

Both the elastomeric support member and the locking member of the alignment member can be made of any suitable elastomeric material. Representative non-limiting examples of elastomeric materials include natural rubber, a polybutadiene rubber, a styrene-butadiene copolymer, a polychloroprene rubber, an ethylenepropylene copolymer, an ethylene-propylene-diene terpolymer, an acrylonitrile-butadiene copolymer, a polyisoprene rubber, an isobutylene-isoprene copolymer, a chlorinated polyethylene rubber, a chlorosulfonated polyethylene rubber, a silicone rubber, a urethane rubber, an acrylic rubber, a polyisobutylene rubber, a fluorine-containing rubber, a fluorosilicone rubber, and blends thereof. In some embodiments, the elastomeric material is infused with electrically conductive materials to render the elastomeric material electrically conductive thereby allowing the clip assembly to act as a ground between the solar module and the rail. In some embodiments, the locking member and the support member are made of the same elastomeric material. In some embodiments, the locking member and the support member are made of a different elastomeric material.

In some embodiments, at least one of the base aperture, the support aperture or the bracket aperture have the same geometric configuration of the fastener nut to prevent the fastener nut from rotating freely when positioned within the clip. In some embodiments, the base aperture and the bracket aperture are the same geometric configuration as the fastener nut. In some embodiments, the support aperture has a different geometric configuration than at least one, if not all, of the base aperture, bracket aperture, or the fastener nut.

Turning to FIGS. 2A-2E, adjustable clip 200 is shown positioned on or secured to an end portion 251 of a rail 250 configured to secure a solar module (not shown). Clip 200 (as well as clip 300 and 400a, 400b described hereinbelow) includes each of the elements of clip 100. As depicted, the rail 250 may include a first and second side wall 252, 253 separated from each other by a top wall 254 creating a channel 255 therebetween. In some embodiments, the side walls 252, 253 may be generally L-shaped.

As depicted, fastener 205 passes through a rail slot 260 (see FIG. 2E) recessed in top wall 254, base aperture 225, support aperture 235, and bracket aperture 245 from a bottom side of the rail 254. The fastener 205 including a head portion 206 configured to drive the fastener 205 into the threaded channel of the alignment member 210. The head portion 206 of the fastener 205 extending from the bottom surface of the top wall 254 and into a portion of channel 255.

Figure 2E:
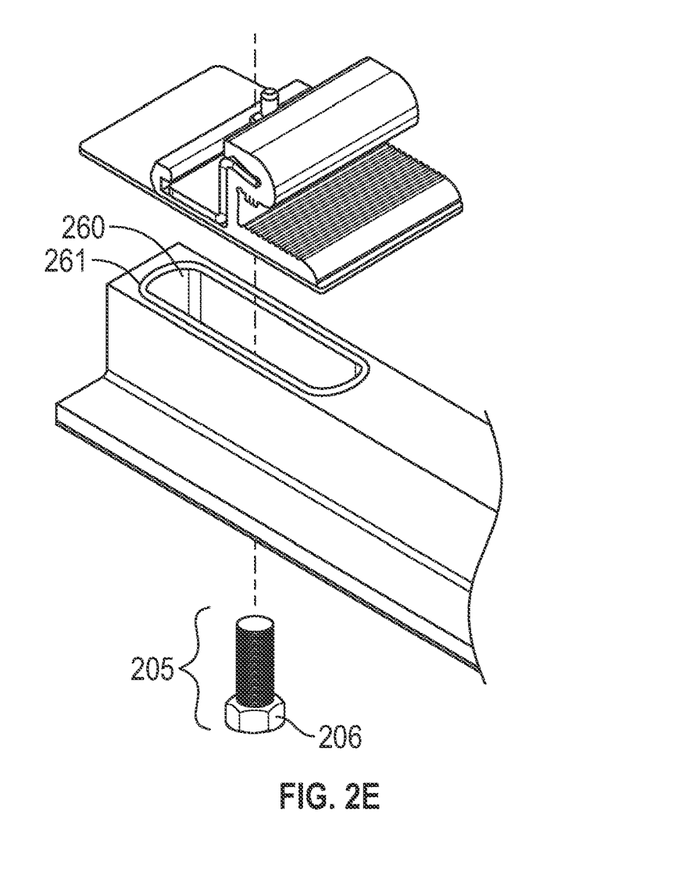
FIG. 2E is a perspective view of a rail prior to attachment of a clip assembly thereon as described in at least one embodiment herein.

As can be seen in a FIG. 2E, the edge 261 around the rail slot 260 in top wall 254 is recessed and also extends slightly into a portion of the channel 255. The edge 261 around rail slot 260 is configured to receive the head (not shown) of the alignment member 210 therein, such that the head 212 of the alignment member 210 can sit flat within the recessed edge 261 and also be slid along the recessed edge 261 to allow the clip assembly to be slidably adjustable along a length of the top wall 254 of the rail 250. The length being determined by the length of the rail slot 260 and/or recessed edge 261. By being slidably adjustable, the clip assembly 200 and overall rail system can accommodate different size solar modules as needed.

As further depicted in FIGS. 2A-2E, the width of the clip assembly 200, and particularly the base member of the clip assembly 200, is greater than the width of the top rail 254. The tangs 227 of the clip assembly 200 are separated from each other a distance generally equal to or slightly greater than the width of the top wall 254 of the rail 250 to assist in maintaining the clip assembly 200 on the top rail 254 and preventing the clip assembly 200 from tipping off the top rail 254 when slid.

Figure 3A:
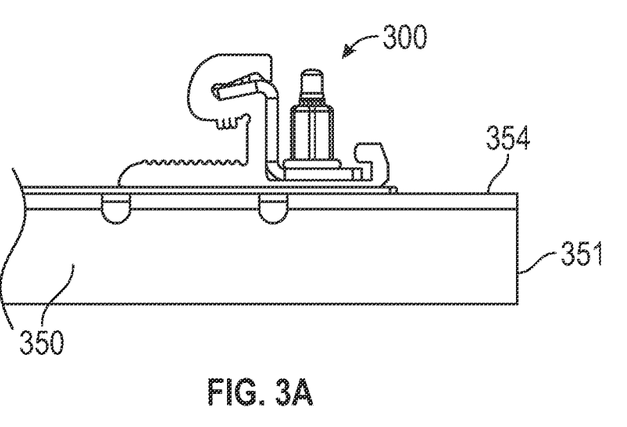
FIGS. 3A and 3C are a side view of a clip assembly and rail as described in at least one embodiment herein.
Figure 3B:
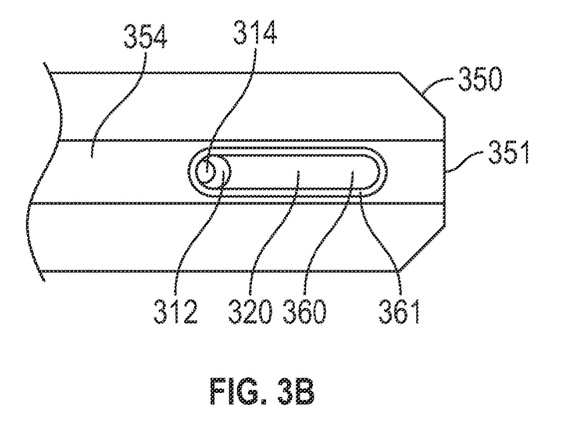
FIGS. 3B and 3D are a bottom view of the clip assembly and rail of FIGS. 3A and 3C, respectively, and as described in at least one embodiment herein.

In FIGS. 3A-3D, the clip assembly 300 is illustrated with each of the parts of the assembly, i.e., the base member, the support member, the bracket member and the alignment member, matingly engaged with one another and positioned on the top wall 354 of the rail 350 in a manner suitable for sliding along the top rail 354. In FIGS. 3A and 3B, the clip assembly 300 is shown in a distal most position, i.e., closest to the solar module, on the rail 350 with the head 312 of the alignment member 310 positioned on the rail edge 361 within the rail slot 360. Channel 314 of the alignment member 310 can be seen within rail slot 360 from beneath the rail 350, the channel 314 awaiting receipt of a fastener, from the bottom side of the top wall 354 of the rail 350, to secure the clip assembly 300 to the rail 350.

Figure 3C:
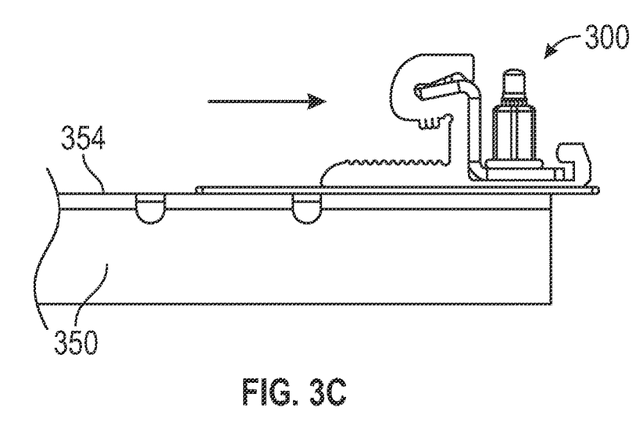
Figure 3D:
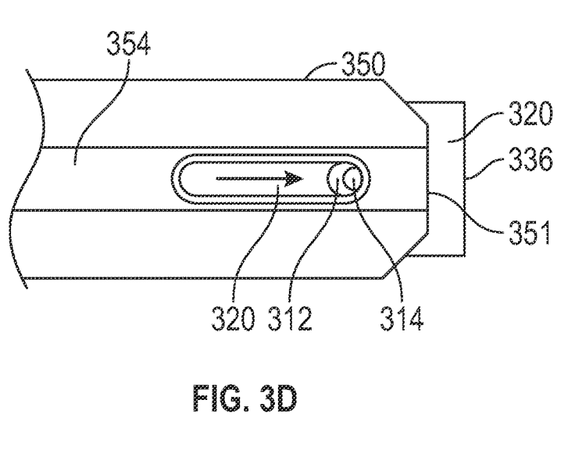

In FIGS. 3C-3D, the clip assembly 300 is shown in a proximal most position, i.e., farthest from the end of the solar module, on the rail 350 with the head 312 of the alignment member 310 positioned within the rail slot 360. Channel 314 of the alignment member 310 awaiting receipt of a fastener, from the bottom side of the top wall 354 of the rail 350, to secure the clip assembly 300 to the rail 350. In some embodiments, as shown in FIGS. 3C-3D, the proximal end 336 of the base member 320 may extend beyond the end 351 of the rail 350.

The fastener (not shown) may be positioned within channel 314 and not completely tightened to allow the clip assembly 300 to be loosely secured to the rail 350, i.e., attached to the rail but remaining capable of sliding and/or adjustability along a length of the rail. Once an end of the solar module is received within the module slot of the elastomeric support member, the fastener can be tightened to fix the clip assembly 300 relative to the rail 350 and the solar module.

In FIGS. 4A-4B, a solar power rack system is shown including a mounting structure 480, a rail 450, a support arm 470, a solar module 490, and a plurality of clip assemblies 400a, 400b as described herein. The mounting structure 480 is configured to be mounted to a torque tube, vertical support, or other beam suitable for supporting a rack system. Rail 450 is attached to and extending from the mounting structure 480. The support arm 470 also extends from the mounting structure 480 to a distal portion of an underside of the rail 450 to provide additional mechanical support or strength to the rail 450 in maintaining the weight of the solar module 490 in a fixed planar configuration. In some embodiments, the rails 450 and support arms 470 can pivot about the mounting structure 480. In some embodiments, the support arms 470 can further lock the rail 450 into a horizontal or vertical position via the side slot 491 with side rail 432 in which support arm 470 attaches to the rail 450.

Although only one rail and support arm are depicted, the solar power rack systems and the kits for solar power rack systems, described herein may include a plurality of rails, support arms, clip assemblies, and solar modules as needed. In addition, although depicted from a side view wherein the clip assemblies described herein are only positioned on two opposite sides of a solar module, it is envisioned that the clip assemblies may be positioned on more than two opposite sides of the solar module to secure the module to the rail. For example, in some embodiments, the rails described herein may interconnect with each other to form a grid which surrounds the outer perimeter of the solar module in its entirety, and the clip assemblies may be used to secure the modules to the rail on all sides of the solar module.

In some embodiments, the solar modules can be secured to a system of rails. As shown in FIGS. 4A-4B, in some embodiments, a method of securing a solar module 490 to a solar power rail system 500 includes: providing a first rail 450 attached to a base support structure 480, the first rail 450 including at least a first rail slot defined therethrough and including a recessed edge around the perimeter of the first rail slot, positioning a first and second clip assembly 400a, 400b within the first rail slot wherein the first and second clip assembly 400a, 400b each include a base member 420a, 420b, support member 430a, 430b, bracket member, 440a, 440b and alignment member 410a, 410b as described herein, as well as fastener 405a, 405b to loosely or temporarily secure the clip assemblies 400a, 400b to the rail 450, and particularly, a top wall 454 of the rail 450; inserting a first end 490a of a solar module 490 into the elastomeric support 430a of the first clip assembly 400a, and specifically, a first module slot 403a of the elastomeric support member 430a of the first clip assembly 420a; positioning the second clip assembly 400b along the rail slot to a position sufficient to allow a second opposite end 490b of the solar module 490 to be received within the elastomeric support member 430b of the second clip assembly 400b, and particularly, the second module slot 403b of the elastomeric support member 430b of the second clip assembly 400b; and sliding at least one, if not both, of the first and second clips 400a, 400b along the top rail 454 toward the other until the both ends 490a, 490b of the solar module 490 are completely secured between the first and second clip assemblies 400a, 400b; and securing the first and second clip assemblies 400a, 400b to a fixed position within the at least one slot thereby securing the solar module 490 on the rail 450.

In some embodiments, the solar module 490 may be initially tilted relative to the rail 450, as shown in FIG. 4A, to assist with inserting the first end 490a of the solar module 490 into the first clip assembly 400a. In such embodiments, the tilted solar module 490 may be pushed forward into the first clip assembly 400a while simultaneously or sequentially lower the second opposite end 490b of the solar module 490 (as indicated by the arrows of FIG. 4A) to a position generally parallel to the second clip assembly 400b, as indicated in FIG. 4B.

In some embodiments, once generally parallel, any combination of the first and second clip assemblies 400a, 400b can be slid inwardly toward the solar module 490 (as indicated by the arrows in FIG. 4B) to secure the solar module 490 therebetween. In some embodiments, the solar module 490 is vertically spaced apart from the top wall 454 of the rail 450 by a thickness ($T_5$) of the base member 420 and the support base 438a, 438b of the elastomeric support member 430a, 430b.

In some embodiments, the methods utilize first and second clip assemblies that include a base member configured to slide along a surface of first rail, the base member including a base aperture, an elastomeric support member configured to be positioned on a top surface of the base member opposite the rail, the elastomeric support member including a support aperture, a bracket member configured to be positioned on a top surface of the elastomeric support member opposite the base member, the bracket member including a bracket aperture, and an alignment member having an elongate body defined between a first end portion and a second end portion, the first end portion including a head and the elongate body including a channel extending therethrough, the alignment member including a resilient locking member fixed on an outer perimeter of the elongate body between the first and second end portions, the elongate body positioned through the base aperture, the support aperture and the bracket aperture securing the base member, the elastomeric support member and the bracket member between the head and the resilient locking member of the alignment member.

In some embodiments, the first clip assembly is fastened within the first rail slot and the second clip assembly is fastened within a second rail slot wherein the first and second rail slots are positioned on end portions of the first rail.

In some embodiments, the first clip assembly may be fastened to the rail in a fixed position prior to the first end of the solar module being inserted in the first clip assembly.

In some embodiments, the first clip assembly may be fastened to the rail in a fixed position only after the first end of the solar module is inserted in the first clip assembly.

In some embodiments, the second clip assembly may be fastened to the rail in a fixed position only after the second end of the solar module is inserted in the second clip assembly and the first clip assembly is in a fixed position.

While the clip assemblies, rails, solar modules, and solar power systems have been described in connection with several different embodiments, it should be apparent that the present application is not intended to be limited only to those embodiments. Rather, many modifications and variations will be apparent to persons of ordinary skill in this art without departure from the scope and spirit of the present application.

What is claimed is:

1. An adjustable clip assembly for mounting at least one solar module to a railing system, the clip assembly comprising,
   a base member configured to slide along a surface of a rail, the base member including a base aperture,
   an elastomeric support member configured to be positioned on a top surface of the base member opposite the rail, the elastomeric support member including a support aperture,
   a bracket member configured to be positioned on a top surface of the elastomeric support member opposite the base member, the bracket member including a bracket aperture, and
   an alignment member having an elongate body extending from a head on a first end portion of the alignment member and including a resilient locking member spaced along a length of the elongate body from the head, the alignment member configured to secure the base member, the elastomeric support member and the bracket member between the head and the resilient locking member of the alignment member to form the clip assembly.

2. The adjustable clip assembly of claim 1, wherein the base aperture, the support aperture, and the bracket aperture are vertically aligned.

3. The adjustable clip assembly of claim 1, wherein resilient locking member fixed on an outer perimeter of the elongate body.

4. The adjustable clip assembly of claim 1, wherein the elongate body further includes a threaded channel defined therethrough.

5. The adjustable clip assembly of claim 1, wherein the base member is generally planar and includes at least one set of tangs separated by a distance equal to or greater than a width of a rail and generally perpendicular to a bottom surface of the base member.

6. The adjustable clip assembly of claim 1, wherein the bracket member further includes a vertical bracket wall including a first end and a second opposite end, the first end of the vertical bracket wall being attached to a lower flange, the lower flange including the bracket aperture, and the second opposite end of the vertical bracket wall being attached to an upper flange, wherein the lower flange and the upper flange extend away from the vertical bracket wall in opposite directions.

7. The adjustable clip assembly of claim 6, wherein the bracket member further includes at least one locking tab positioned on the upper flange.

8. The adjustable clip assembly of claim 6, wherein the lower flange extends from the first end of the vertical bracket wall a first length which is greater than a second length that the upper flange extends from the second opposite end of the vertical bracket wall.

9. The adjustable clip assembly of claim 6, wherein the lower flange extends from the first end of the vertical wall at a first angle equal to 90° and the upper flange extends from the second opposite end of the vertical bracket wall at a second angle ranging from 45 to 90°.

10. The adjustable clip assembly of claim 6, wherein the elastomeric support member comprises a support base including a first support base portion and a second support base portion, a top surface of the first base portion is configured to receive the lower flange of the bracket member and a top surface of the second base portion is configured to receive an end of the solar module.

11. The adjustable clip assembly of claim 10, wherein the first support base portion is thinner than the second support base portion.

12. The adjustable clip assembly of claim 10, wherein a thickness of the first support base portion and a thickness of the lower flange of the bracket member combined is equal to a thickness of the second support base portion.

13. The adjustable clip assembly of claim 12, wherein the locking member is spaced apart from the head portion of the alignment member a distance equal to or less than the thickness of the first support base portion and the thickness of the lower flange of the bracket member combined to lock the bracket member, the elastomeric support member and the base member between the head and the resilient locking member.

14. The adjustable clip assembly of claim 10, wherein the second support base portion further includes a vertical support member generally perpendicular therefrom and including a generally C-shaped notch on a free end portion opposite the second support base portion, the C-shaped notch configured to receive the upper flange and at least one locking tab of the vertical bracket wall.

15. The adjustable clip assembly of claim 14, wherein the generally C-shaped notch includes a first larger recess configured to receive an end of the upper flange and a second smaller recess configured to receive the at least one locking tabs.

16. The adjustable clip assembly of claim 14, further comprising a plurality of grip elements positioned on an outer surface of the C-shaped notch opposite a top surface of the second support base portion.

17. The adjustable clip assembly of claim 1, further comprising a fastener positioned within the threaded channel of the elongate body.

18. A solar power system comprising:
a rail for supporting a solar module,
a rail slot defined within an end portion of the rail, and
an adjustable clip assembly configured to secure the solar module to the rail via the rail slot, the adjustable clip assembly including
a base member configured to slide along a surface of a rail, the base member including a base aperture,
an elastomeric support member configured to be positioned on a top surface of the base member opposite the rail, the elastomeric support member including a support aperture,
a bracket member configured to be positioned on a top surface of the elastomeric support member opposite the base member, the bracket member including a bracket aperture, and
an alignment member having an elongate body extending from a head on a first end portion of the alignment member and including a resilient locking member spaced along a length of the elongate body from the head, the alignment member configured to secure the base member, the elastomeric support member and the bracket member between the head and the resilient locking member of the alignment member to form the clip assembly.

19. A kit for a solar power system comprising:
a plurality of rails configured to support a solar module, each rail including a rail slot defined within an end portion of the rail, and
a plurality of adjustable clip assemblies configured to secure the solar module to the rail via the slot, each adjustable clip assembly including
a base member configured to slide along a surface of a rail, the base member including a base aperture,
an elastomeric support member configured to be positioned on a top surface of the base member opposite the rail, the elastomeric support member including a support aperture,
a bracket member configured to be positioned on a top surface of the elastomeric support member opposite the base member, the bracket member including a bracket aperture, and
an alignment member having an elongate body extending from a head on a first end portion of the alignment member and including a resilient locking member spaced along a length of the elongate body from the head, the alignment member configured to secure the base member, the elastomeric support member and the bracket member between the head and the resilient locking member of the alignment member to form the clip assembly.

20. An alignment member for an adjustable clip assembly for mounting at least one solar module to a railing system, the alignment member comprising,
an elongate body extending between a first and second end portion,
a head positioned on the first end portion, the head configured to slide along a surface of a rail of the railing system,
a resilient locking member spaced along a length of the elongate body from the head, the resilient locking member fixed on an outer perimeter of the elongate body, and
a threaded channel extending through the elongate body.

* * * * *